(12) United States Patent
Erickson

(10) Patent No.: US 6,895,740 B2
(45) Date of Patent: May 24, 2005

(54) STEAM AMMONIA POWER CYCLE

(75) Inventor: Donald C Erickson, Annapolis, MD (US)

(73) Assignee: Donald C. Erickson, Annapolis, MD (US)

( * ) Notice: Subject to any disclaimer, the term of this patent is extended or adjusted under 35 U.S.C. 154(b) by 0 days.

(21) Appl. No.: 10/348,392

(22) Filed: Jan. 21, 2003

(65) Prior Publication Data

US 2004/0139747 A1 Jul. 22, 2004

(51) Int. Cl.[7] .............................. F02C 6/00; F02G 1/00; F02G 3/00
(52) U.S. Cl. ................... 60/39.182; 60/772; 60/39.181
(58) Field of Search ................... 60/39.181, 39.182, 60/772, 39.183; 122/7 R

(56) References Cited

U.S. PATENT DOCUMENTS

| | | | | |
|---|---|---|---|---|
| 3,436,912 | A | * 4/1969 | Squires ................... | 60/39.181 |
| 3,988,140 | A | * 10/1976 | Burns et al. ............... | 71/34 |
| 4,875,436 | A | * 10/1989 | Smith et al. ............... | 122/7 R |
| 5,860,279 | A | * 1/1999 | Bronicki et al. ............ | 60/655 |
| 5,950,433 | A | 9/1999 | Kalina | |
| 6,058,695 | A | * 5/2000 | Ranasinghe et al. ...... | 60/39.182 |
| 6,065,280 | A | * 5/2000 | Ranasinghe et al. ........ | 60/774 |
| 6,070,426 | A | * 6/2000 | Sakashita et al. ........... | 62/305 |
| 6,173,563 | B1 | * 1/2001 | Vakil et al. ................ | 60/772 |
| 6,195,997 | B1 | 3/2001 | Lewis et al. | |
| 6,266,953 | B1 | * 7/2001 | Ramstetter et al. .......... | 60/783 |
| 6,269,644 | B1 | 8/2001 | Erickson | |
| 6,349,558 | B1 | * 2/2002 | Ichikawa et al. ............ | 62/434 |
| 6,397,596 | B1 | * 6/2002 | Boyle ....................... | 60/597 |
| 6,435,138 | B2 | * 8/2002 | Shimada et al. ............ | 122/7 R |
| 6,558,643 | B2 | * 5/2003 | Blonigen et al. ........... | 423/356 |

OTHER PUBLICATIONS

Bellot, C., and Fleury, J., "Electricite de France 22 MWe Pilot Plant Operating with an Ammonia Bottoming Cycle", ASME, vol. 118, 1989.

Marrero, A. M., et al., "Second law analysis and optimization of a combined triple power cycle", Energy Conversion and Management, 2002.

* cited by examiner

Primary Examiner—Cheryl Tyler
Assistant Examiner—William H. Rodriguez

(57) ABSTRACT

An integrated steam-ammonia power cycle is disclosed which achieves a close match to a glide heat source such as exhaust from a gas turbine, and which also eliminates sub-atmospheric pressure operation. With reference to FIG. 1, the exhaust heats in sequence steam superheater 107; steam boiler 105; feedwater preheater 104 plus ammonia superheater 103; and ammonia preheater 102. Steam is expanded to at least 17 psia in turbine 108, then condensed to boil ammonia in boiler 110. Superheated ammonia is expanded in turbine 112, and condensed in condenser 114. Feed ammonia is preheated in at least two parallel preheaters.

22 Claims, 3 Drawing Sheets

STEAM AMMONIA POWER CYCLE

CROSS-REFERENCE TO RELATED APPLICATIONS

Not applicable.

STATEMENT REGARDING THE FEDERALLY SPONSORED RESEARCH OR DEVELOPMENT

Not applicable.

REFERENCE TO SEQUENCE LISTING, A TABLE OR A COMPUTER PROGRAM LISTING APPENDIX

Not applicable.

BACKGROUND OF THE INVENTION

Gas turbines produce a relatively clean hot exhaust gas stream. Modern gas turbine combined cycle (GTCC) power plants have a steam-Rankine bottoming cycle which is heated by that exhaust which produces about half as much power as the gas turbine. In order for the steam cycle to more closely match the temperature glide of the exhaust, and hence be more efficient, there are typically two or three boiling pressures, and one or more reheats, especially in the larger plants. Even with that level of complexity, there remain problems and inefficiencies. The boilings are at constant temperature, so that part of the heat acceptance necessarily departs from the temperature glide of the heat source.

In the low temperature range, the boiling pressure of steam is on the order of one to five atmospheres. Any lower boiling pressure would require much larger flow passages and bulkier, costlier equipment, to mitigate serious pressure drop penalties. Similarly, the heat rejection is at deep vacuum. Much design effort is required to make the turbine final stages, exit passages, and condenser inlet passages very large and with low-pressure drop. It has been pointed out that this condenser design condition (typically 101° F. and 7 kPa absolute pressure) prevents steam plants from taking much advantage of colder-than-design conditions. Vacuum operation also allows air in-leakage, making de-aeration necessary, which adds to the thermal losses. The deep vacuum condenser must be bulky, with large flow passages, and has low transfer coefficients and high pressure drop losses. Those conditions also mitigate against air-cooled condensers.

The four inter-related factors of constant pressure boiling, vacuum, pressure loss, and cost make steam plants not very effective in the low temperature regime. Any tabulation of the loss mechanisms of multi-pressure steam plants is dominated by the low-pressure components. The capacity and efficiency of conventional steam bottoming cycles are critically dependent on using lots of cooling water to maintain low vacuum, and the low vacuum in turn makes it extremely difficult and costly to accomplish dry cooling.

Ammonia Rankine cycles are well known in the prior art. They have been applied in ocean thermal energy conversion (OTEC) applications, and elsewhere using low temperature heat sources. A 22 MW experimental prototype of an ammonia bottoming cycle for a nuclear-powered steam cycle has been tested. Steam under vacuum (about 0.5 bar absolute) boiled the ammonia, which was expanded without superheating. Ammonia extraction vapor was designated for feed heating. The objective was to overcome the limitations of the conventional vacuum steam condensation. A more recent study analytically investigated a triple power cycle wherein gas turbine exhaust heated a steam bottoming cycle, condensing steam boiled the ammonia, and exhaust superheated the ammonia vapor. That disclosed cycle has several disadvantages, including use of extraction steam for feedwater heating; no steam reheat; and no preheating of feed ammonia or feedwater by the exhaust. Other prior art power cycles incorporate ammonia turbines for impure ammonia, e.g., U.S. Pat. Nos. 6,058,695, 6,194,997, 5,950,433, and 6,269,644. Given the high condensing pressure of ammonia, air-cooling is more readily achieved.

What is needed, and included among the objects of this invention, is a bottoming cycle for a gas turbine, i.e. a power cycle for input glide heat above about 600° F., which achieves higher efficiency by achieving a better glide match with the heat source, and which also avoids the disadvantages associated with vacuum operation.

BRIEF SUMMARY OF THE INVENTION

The above and other useful advantages are provided by: an integrated steam-ammonia power cycle for a gas turbine combined cycle plant, said plant comprised of a gas turbine, an exhaust heated steam boiler, a steam superheater and a steam turbine, said power cycle additionally comprised of:
a) a steam condenser/ammonia boiler;
b) an ammonia superheater, and a feedwater preheater which are heated by said exhaust after said steam boiler;
c) an ammonia turbine, condenser, and feed pump; and
d) an ammonia feed preheater which is heated by said exhaust after said feedwater preheater and ammonia superheater.

Note that this combination is not the simple addition of an ammonia bottoming cycle to the turbine exhaust after the steam bottoming cycle. Were that to be done, the ammonia cycle would suffer the same losses due to constant pressure boiling that the steam cycle does. In the disclosed cycle, the ammonia boiling is provided by a constant temperature heat source—steam condensation. Hence, the losses are very minor—the temperature differential of the condenser/boiler—and much less than the avoided losses due to elimination of vacuum operation. The constant pressure boiling (from a glide source) penalty is only incurred once—in the steam portion of the cycle. The glide heat from the exhaust is only used in glide applications—superheating and feed liquid preheating—and hence can be matched almost perfectly.

The large liquid preheating requirement for ammonia makes it necessary to use both exhaust heat and ammonia vapor de-superheat to supply it. Even so, it extracts more heat from the exhaust than the conventional steam cycle. The exhaust is cooled well into the condensation range. This necessitates appropriate measures for handing acidic condensate. However, it provides compensating advantages—it very effectively reduces emissions, and provides a ready source of water which can be used for cycle enhancement (e.g., fog injection) or for cooling. When necessary, some of that ammonia preheat duty can be supplied by steam condensation, and/or by ammonia extraction vapor, with some reduction in cycle efficiency.

It is preferred to operate the steam condenser/ammonia boiler above atmospheric pressure on the steam side. That way, no air in-leakage is possible, and no de-aerating feed tank is necessary during normal operation. Thus, more glide heat is available to ammonia superheating, and cycle efficiency improves. The practical lower limit is about 17 psia. Clearly, there will be certain applications where other considerations dictate some degree of vacuum for the steam pressure, down as low as 10 psia.

It is beneficial to maintain at least about 20 parts per million to 5000 parts per million steam in the ammonia vapor, to inhibit corrosion and thermal decomposition. That is done by maintaining approximately 0.1% to five percent water in the ammonia boiler. The water in turn should be inhibited by NaOH or equivalent to a pH in the approximate range of 10 to 10.5.

DETAILED DESCRIPTION OF THE INVENTION

Figure 1:
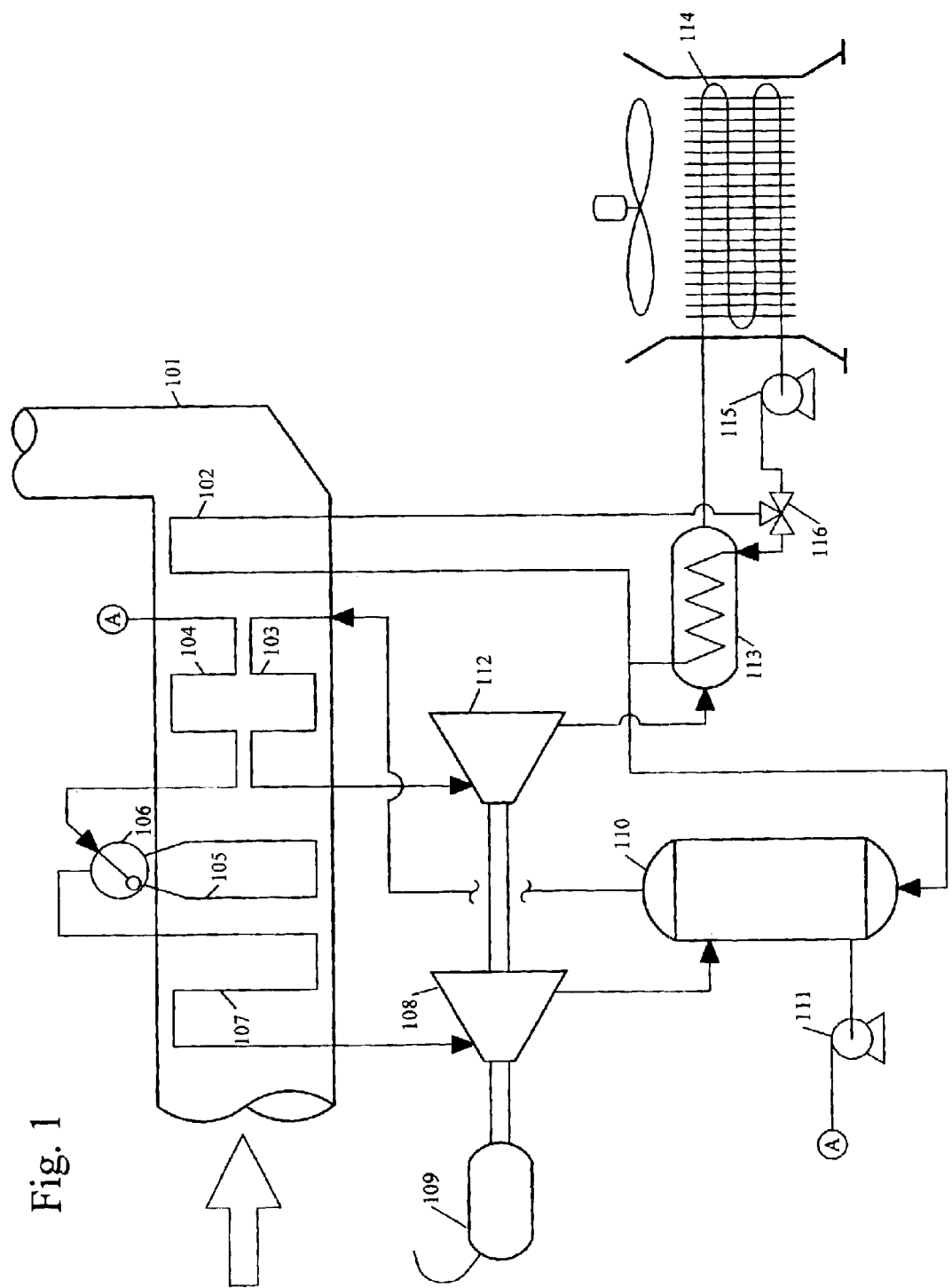
FIG. 1 is a schematic flowsheet of the steam ammonia power cycle wherein both the steam portion of the cycle and the ammonia portion have only a single turbine, and wherein feedwater is entirely preheated by exhaust.

Referring to FIG. 1. heat recovery unit (HRU) 101 is comprised of ammonia economizer (preheater) 102, ammonia superheater 103, feedwater economizer 104, steam boiler 105 and associated steam drum 106 and steam superheater 107. The superheated steam is expanded in steam turbine 108 to produce work, which powers electrical generator 109. Exhaust steam is condensed in steam condenser/ammonia boiler 110. The condensed steam is pressurized to feedwater pressure by feedwater pump 111, and routed to economizer 104. Ammonia vapor from boiler 110 is routed to ammonia superheater 103, then expanded in ammonia turbine 112, producing additional work. Expanded ammonia vapor is desuperheated in ammonia economizer 113, and then condensed in ammonia condenser 114. Condensed ammonia is pressurized to feed pressure by ammonia feed pump 115, and then proportioned between exhaust ammonia economizer 102 and desuperheating ammonia economizer 113 by splitter 116. The preheated ammonia feed is then sent to ammonia boiler 110, completing the cycle.

As example operating conditions for the FIG. 1 flowsheet, consider a 900° F. exhaust gas. Steam is boiled at 600 psia and superheated to 850° F., then expanded to 17 psia and 220° F. in turbine 108. Each pound of steam condensed in condenser 110 produces 3.09 pounds of ammonia vapor at 890 psia, and each pound of steam expanded produces 300 BTU of work in an 84% isentropic efficiency turbine. The 3.09 pounds of ammonia vapor is superheated to 460° F., then expanded to 196 psia, producing 105 BTU/lb work in an 84% turbine (324.5 BTU for the 309 pounds). The ammonia is then desuperheated to preheat approximately half the feed ammonia, and then condensed at 95° F. The other half of the feed ammonia is preheated in economizer 102.

Figure 2:
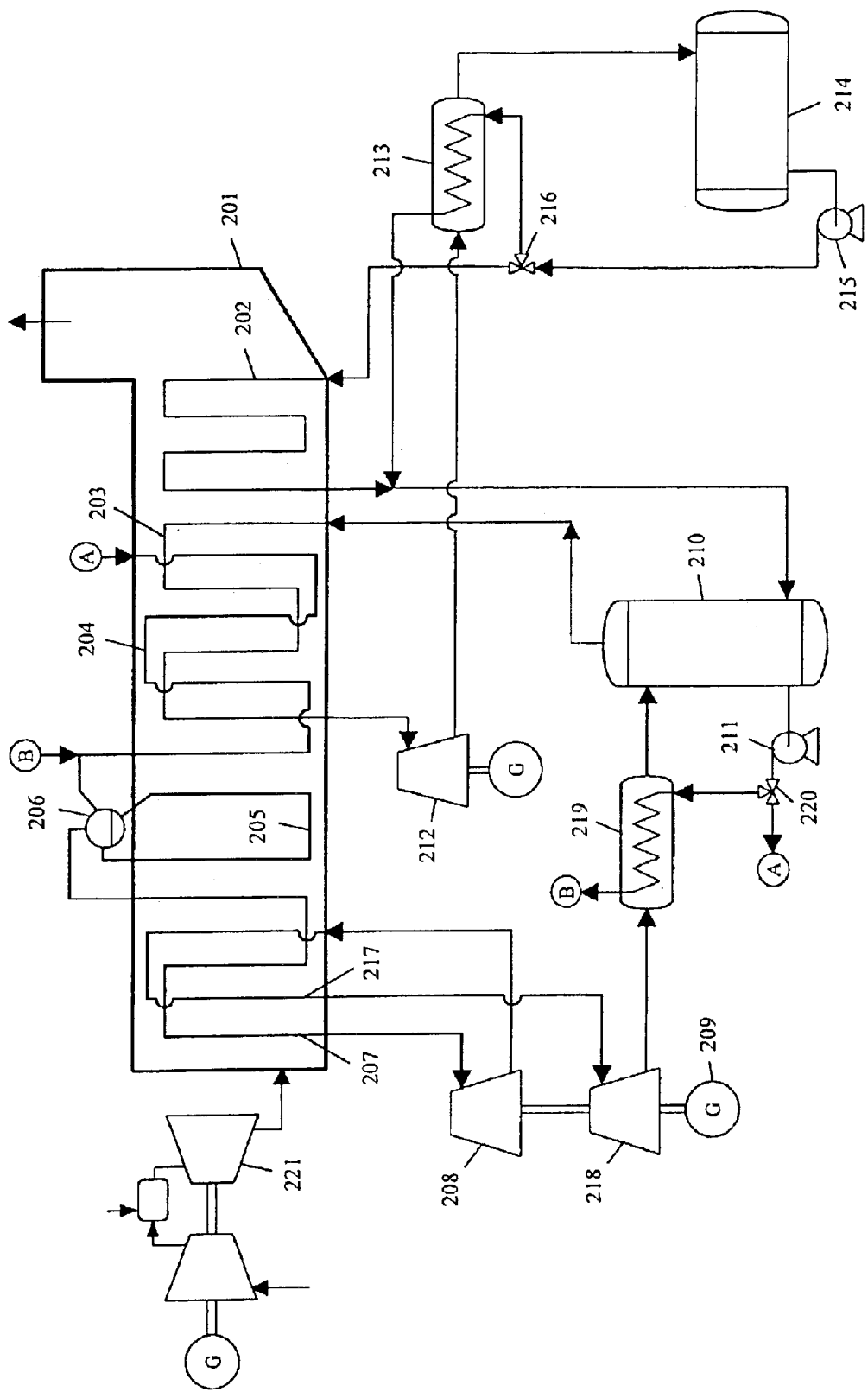
FIG. 2 depicts a two-turbine reheat cycle for the steam portion, and also has part of the feedwater preheat from desuperheating the reheat turbine exhaust.
Figure 3:
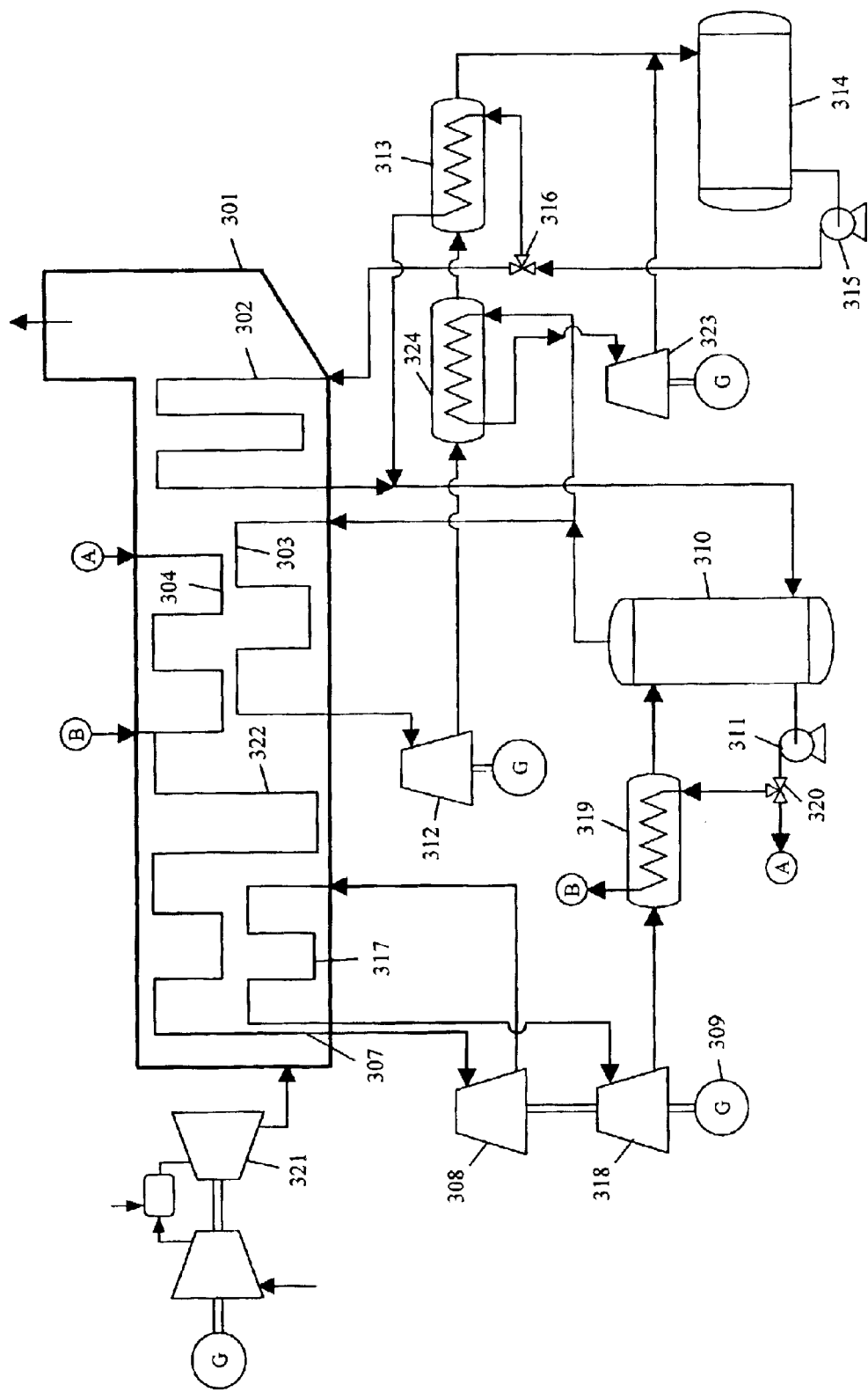
FIG. 3 depicts a near-critical once-through boiler in the steam section, and a second turbine in the ammonia portion.

In FIG. 2, like-numbered 200 series components have the same description as their FIG. 1 counterparts. The added features in the FIG. 2 flowsheet are steam reheater 217, reheat steam turbine 218 (intermediate pressure turbine), steam desuperheater/feedwater preheater 219, feedwater splitter 220, plus the gas turbine 221. In FIG. 3, the steam boiler 322 is depicted as once through type, i.e., no steam drum, such as would be used for near-critical or super-critical steam generation. Also, a second ammonia turbine 323 is depicted. It operates over the same pressure range as primary ammonia turbine 312, but at a lower temperature. The ammonia vapor expanded in it receives lower temperature superheat from any available source, e.g., from desuperheater/superheater 324. This turbine is used to help balance the latent duties of condenser/boiler 310, while at the same time maximizing the superheat temperature in 303.

Dependent upon the exhaust temperature entering HRU 301, it may be desirable to add a second reheater plus second reheat turbine, at lower pressure. In general, the turbine exhaust temperature and the plant size will determine how many turbines are used, e.g., choice of FIGS. 1, 2, or 3. Larger plants and higher exhaust temperatures justify the added number of turbines, as higher efficiencies are achieved. The disclosed eonomizers (or preheaters) are key to achieving high cycle efficiency, i.e., good glide matching down to low temperature.

Various other features commonly encountered in GTCC plants would be present when appropriate: attemperators, rotor air coolers, fuel (gas) preheaters, etc.

The ammonia turbine(s) operate in a favorable pressure ratio range between 3 and 10, with little or no condensation in the exhaust. The same applies to the steam turbines when more than one (i.e., reheat) is used. The single steam reheat adds markedly to cycle performance.

Any of the figures or disclosed cycle variants adapt readily to dry cooling (air only) or to evaporative cooling, with either saturated or unsaturated exhaust air.

What is claimed is:

1. An integrated steam-ammonia power cycle for a gas turbine combined cycle plant, said plant comprised of a gas turbine, an exhaust heated steam boiler, a steam superheater and a steam turbine, said power cycle additionally comprised of:
    a) a steam condenser/ammonia boiler;
    b) an ammonia superheater, and a feedwater preheater which are heated by said exhaust after said steam boiler;
    c) an ammonia turbine, condenser, and feed pump; and
    d) an ammonia feed preheater which is heated by said exhaust after said feedwater preheater and ammonia superheater.

2. The cycle according to claim 1 additionally comprised of a parallel ammonia feed preheater which is heated by exhaust vapor from said ammonia turbine, plus a feed splitter which proportions feed between said ammonia preheaters.

3. The cycle according to claim 1 additionally comprised of a parallel feedwater preheater which is heated by exhaust vapor from said steam turbine, plus a feedwater splitter which proportions feedwater between said preheaters.

4. The cycle according to claim 1 additionally comprised of a second ammonia superheater which is heated by exhaust vapor from said steam turbine.

5. The cycle according to claim 1 additionally comprised of a steam reheater which reheats the exit steam from said steam turbine by said exhaust before said boiler, and a second steam turbine which work expands said reheat steam and discharges it to said steam condenser/ammonia boiler.

6. The cycle according to claim 1 additionally comprised of parallel feed preheaters heated by different sources plus a splitter for both the feedwater and the ammonia feed.

7. The cycle according to claim 1 additionally comprised of a second ammonia turbine which is supplied with the same pressure and a lower superheat temperature than said ammonia turbine.

8. The cycle according to claim 1 wherein said ammonia condenser is air-cooled.

9. The cycle according to claim 1 wherein said ammonia condenser is evaporatively-cooled.

10. A power plant comprised of:
   a) a gas turbine;
   b) a heat recovery unit for the exhaust gas from said gas turbine, said heat recovery unit (HRU) comprised of in order from hot end to cold end:
      i. a steam superheater;
      ii. a steam boiler; and
      iii. an ammonia superheater and feedwater heater;
   c) a steam turbine which is supplied said superheated steam;
   d) a steam condenser/ammonia boiler for the exhaust from a steam turbine;
   e) an ammonia turbine which is supplied said superheated ammonia; and
   f) an ammonia condenser.

11. The power plant according to claim 10 additionally comprised of an ammonia feed pump plus an ammonia feed heater at the cold end of said HRU.

12. The power plant according to claim 10 additionally comprised of an ammonia feed heater for at least part of said ammonia feed, which exchanges heat with the exhaust from said ammonia turbine.

13. The power plant according to claim 10 additionally comprised of a second feedwater heater for heating part of said feedwater by heat exchange with exhaust from said steam turbine, before said condensing.

14. The power plant according to claim 10 additionally comprised of a steam reheater in said HRU in a hotter section than said steam boiler, and a second steam turbine for said reheated steam, said steam reheater being supplied from said first steam turbine exhaust.

15. The power plant according to claim 14 additionally comprised of a second feedwater heater for heating part of said feedwater by heat exchange with exhaust from said second steam turbine, before condensing said exhaust in said condenser/evaporator.

16. The power plant according to claim 10 additionally comprised of a second ammonia superheater in said HRU in a hotter section than said steam boiler, and a second ammonia turbine.

17. The power plant according to claim 10 additionally comprised of a second ammonia turbine which is supplied with superheated ammonia from heat exchange with the exhaust of said first ammonia turbine.

18. A process for producing power from a hot combustion gaseous exhaust comprising:
   a) heating in sequence a steam superheater, a steam boiler, an ammonia vapor superheater, and an ammonia economizer by said exhaust;
   b) expanding said steam in a power producing turbine to a super-atmospheric pressure between 17 and 35 psia;
   c) condensing said expanded steam by boiling ammonia at a pressure between 600 and 1500 psia;
   d) superheating said boiled ammonia in said heating step; and
   e) expanding said superheated ammonia in a power producing ammonia turbine to a pressure between 100 and 280 psia.

19. The process according to claim 18 wherein said steam expanding step is in at least two stages, and comprising at least one steam reheating step between the expanding stages.

20. The process according to claim 18 additionally comprising heating feedwater in parallel with said ammonia superheating step.

21. The process according to claim 18 additionally comprising maintaining at least about 20 ppm to 5000 ppm steam in said ammonia vapor.

22. An integrated steam-ammonia power cycle for a gas turbine combined cycle plant, said plant comprised of a gas turbine, an exhaust heated steam boiler, a steam superheater and a steam turbine, said power cycle additionally comprised of;
   a) a steam condenser/ammonia boiler:
   b) an ammonia superheater, and a feedwater preheater which are heated by said exhaust after said steam boiler;
   c) an ammonia turbine, condenser, and feed pump;
   d) an ammonia feed preheater which is heated by said exhaust after said feedwater preheater and ammonia superheater; and
   e) a second ammonia turbine which is supplied the same pressure and a lower superheat temperature than said ammonia turbine.

* * * * *